(12) United States Patent
Yoshida

(10) Patent No.: US 10,550,913 B2
(45) Date of Patent: Feb. 4, 2020

(54) FRICTION TRANSMISSION BELT

(71) Applicant: BANDO CHEMICAL INDUSTRIES, LTD., Kobe (JP)

(72) Inventor: Yasuhiko Yoshida, Kobe (JP)

(73) Assignee: Bando Chemical Industries, Ltd., Kobe-shi, Hyogo (JP)

( * ) Notice: Subject to any disclaimer, the term of this patent is extended or adjusted under 35 U.S.C. 154(b) by 62 days.

(21) Appl. No.: 15/906,648

(22) Filed: Feb. 27, 2018

(65) Prior Publication Data
US 2018/0187747 A1 Jul. 5, 2018

Related U.S. Application Data

(63) Continuation of application No. PCT/JP2016/003358, filed on Jul. 15, 2016.

(30) Foreign Application Priority Data

Aug. 27, 2015 (JP) ................................. 2015-167890

(51) Int. Cl.
| | |
|---|---|
| C08L 23/16 | (2006.01) |
| B32B 27/32 | (2006.01) |
| F16G 1/10 | (2006.01) |
| F16G 5/08 | (2006.01) |
| F16G 5/20 | (2006.01) |
| B32B 3/30 | (2006.01) |
| B32B 5/02 | (2006.01) |
| B32B 7/12 | (2006.01) |
| B32B 27/12 | (2006.01) |

(52) U.S. Cl.
CPC ................ *F16G 1/10* (2013.01); *B32B 3/30* (2013.01); *B32B 5/02* (2013.01); *B32B 7/12* (2013.01); *B32B 27/12* (2013.01); *B32B 27/32* (2013.01); *C08L 23/16* (2013.01); *F16G 5/08* (2013.01); *F16G 5/20* (2013.01); *B32B 2250/02* (2013.01); *B32B 2255/10* (2013.01); *B32B 2255/26* (2013.01); *B32B 2323/16* (2013.01); *B32B 2413/00* (2013.01); *C08L 2205/025* (2013.01); *C08L 2312/02* (2013.01)

(58) Field of Classification Search
CPC ..... F16G 1/06; F16G 1/08; F16G 1/10; C08L 23/16; C08L 2205/025
See application file for complete search history.

(56) References Cited

U.S. PATENT DOCUMENTS

| | | | |
|---|---|---|---|
| 2002/0007011 A1* | 1/2002 | Konno | C08L 33/066 525/84 |
| 2002/0032091 A1 | 3/2002 | Okuno et al. | |
| 2007/0010641 A1* | 1/2007 | Adur | C08L 23/16 526/237 |
| 2010/0069190 A1 | 3/2010 | Yoshida | |

FOREIGN PATENT DOCUMENTS

| | | |
|---|---|---|
| JP | 2002-081506 A | 3/2002 |
| JP | 2006-300149 A | 11/2006 |
| JP | 2008-120902 A | 5/2008 |
| WO | 2007/018148 A1 | 2/2007 |
| WO | 2010/047029 A1 | 4/2010 |

* cited by examiner

*Primary Examiner* — Jeffrey C Mullis
(74) *Attorney, Agent, or Firm* — Knobbe, Martens, Olson & Bear, LLP

(57) ABSTRACT

A pulley contacting portion of a friction transmission belt is made of a rubber composition containing an EPDM mixture as a rubber component. The EPDM mixture as the rubber component includes a first EPDM with an ethylene content of 67% by mass or more and a second EPDM with an ethylene content of 57% by mass or less. A content of the second EPDM in the EPDM mixture is larger than a content of the first EPDM in the EPDM mixture. An average ethylene content of the EPDM mixture is 54% by mass or more and 59% by mass or less.

8 Claims, 6 Drawing Sheets

FRICTION TRANSMISSION BELT

CROSS-REFERENCE TO RELATED APPLICATIONS

This is a continuation of International Application No. PCT/JP2016/003358 filed on Jul. 15, 2016, which claims priority to Japanese Patent Application No. 2015-167890 filed on Aug. 27, 2015. The entire disclosures of these applications are incorporated by reference herein.

TECHNICAL FIELD

The present invention relates to a friction transmission belt.

BACKGROUND ART

Friction transmission belts with a pulley contacting portion made of a rubber composition containing EPDM (ethylene-propylene-diene monomer) as a rubber component have been known.

Japanese Unexamined Patent Publication No. 2006-300149 discloses a V-ribbed belt in which a compressed rubber layer as a pulley contacting portion is made of a rubber composition containing an EPDM mixture as a rubber component. The EPDM mixture includes an EPDM with an ethylene content of 40% by mass or more and 59% by mass or less, and an EPDM with an ethylene content of 68% by mass or more and 90% by mass or less.

Japanese Unexamined Patent Publication No. 2002-081506 discloses a V-ribbed belt in which a compressed rubber layer as a pulley contacting portion is made of a rubber composition containing an EPDM mixture as a rubber component. The EPDM mixture includes: 7% by mass or more and 12% by mass or less of a high molecular weight EPDM component in which the molecular weight is $10^6$ or more and the ethylene content is 65% by mass or more; and 26% by mass or more and 60% by mass or less of a low molecular weight EPDM component in which the molecular weight is $10^5$ or less and the ethylene content is 60% by mass or less.

Re-publication of PCT International Publication No. 2010/047029 discloses a flat belt in which a rubber layer as a pulley contacting portion of a belt body is made of a rubber composition containing an EPDM mixture as a rubber component. The EPDM mixture includes an EPDM with an ethylene content of 70% or 85%, and an EPDM with an ethylene content of 52%.

Re-publication of PCT International Publication No. 2007/018148 discloses a V-ribbed belt in which a compressed rubber layer as a pulley contacting portion is made of a rubber composition containing an EPDM mixture as a rubber component. The EPDM mixture includes an EPDM with an ethylene content of 70% and an EPDM with an ethylene content of 50%.

SUMMARY

A friction transmission belt of the present invention has a pulley contacting portion made of a rubber composition containing an EPDM mixture as a rubber component. The EPDM mixture as the rubber component includes a first EPDM with an ethylene content of 67% by mass or more and a second EPDM with an ethylene content of 57% by mass or less. A content of the second EPDM in the EPDM mixture is larger than a content of the first EPDM in the EPDM mixture. An average ethylene content of the EPDM mixture is 54% by mass or more and 59% by mass or less.

DETAILED DESCRIPTION

Embodiments will be described in detail below, based on the drawings.

(V-Ribbed Belt)

Figure 1:
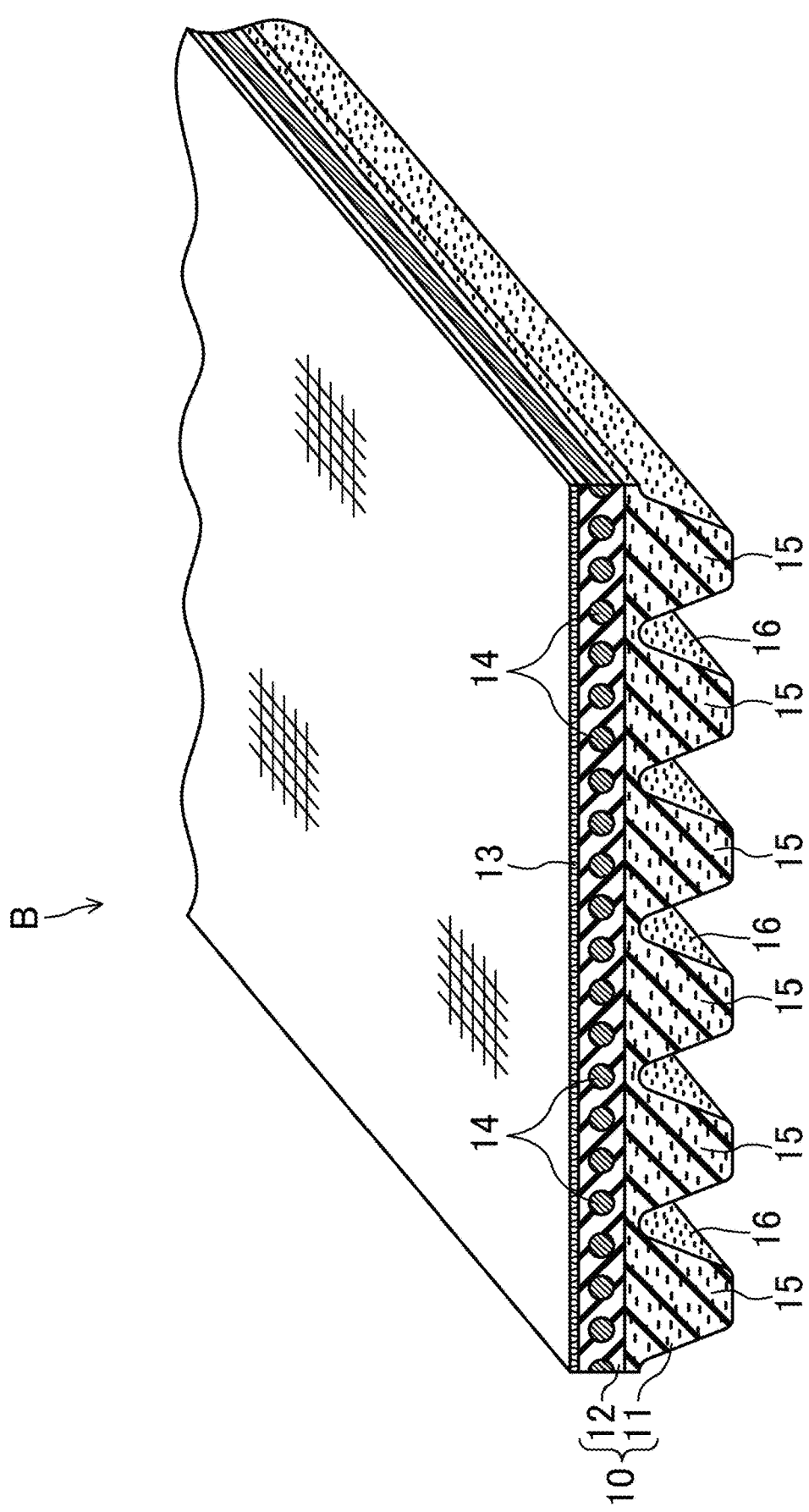
FIG. 1 illustrates a perspective view of a V-ribbed belt according to an embodiment.

FIG. 1 illustrates a V-ribbed belt B (a friction transmission belt) according to an embodiment. The V-ribbed belt B of the embodiment is, for example, an endless belt used in a belt transmission system for driving an accessory provided in an engine compartment of an automobile. The V-ribbed belt B of the embodiment has a length ranging from 700 mm to 3000 mm, a width ranging from 10 mm to 36 mm, and a thickness ranging from 4.0 mm to 5.0 mm, for example.

The V-ribbed belt B of the embodiment has a two-layered V-ribbed belt body 10 made of rubber which includes a compressed rubber layer 11 constituting a pulley contacting portion of an inner side of the belt, and an adhesive rubber layer 12 constituting an outer side of the belt. A backface reinforcing fabric 13 is attached to the belt outer side of the adhesive rubber layer 12 of the V-ribbed belt body 10. A cord 14 is embedded in a middle portion, in the belt thickness direction, of the adhesive rubber layer 12, such that the cord 14 forms a helical pattern having a pitch in the belt width direction. The backface reinforcing fabric 13 may be replaced with a backface rubber layer.

The compressed rubber layer 11 includes a plurality of V-shaped ribs 15 protruding from the inner side of the belt. The plurality of V-shaped ribs 15 are each in the shape of a rib extending in the longitudinal direction of the belt and having an approximately inverted triangular cross-section. The V-shaped ribs 15 are arranged parallel to one another in the width direction of the belt. Each of the V-shaped ribs 15 has, for example, a height ranging from 2.0 mm to 3.0 mm, and a width ranging from 1.0 mm to 3.6 mm at a proximal end. The number of the V-shaped ribs is three or more and six or less (six ribs in FIG. 1), for example.

The compressed rubber layer 11 is made of a rubber composition produced from an uncrosslinked rubber composition prepared by kneading a rubber component with various compound ingredients, including a crosslinker, mixed therein. This uncrosslinked rubber composition is heated and pressed, so that the rubber component is crosslinked by the crosslinker. The thus obtained rubber composition is used for the compressed rubber layer 11.

The rubber component of the rubber composition which forms the compressed rubber layer 11 is an ethylene-propylene-diene monomer (EPDM) mixture.

The EPDM mixture as the rubber component includes one kind, or two or more kinds, of a first EPDM with an ethylene content of 67% by mass or more, and one kind, or two or more kinds, of a second EPDM with an ethylene content of 57% by mass or less. The EPDM mixture as the rubber component may include a third EPDM with an ethylene content of higher than 57% by mass and lower than 67% by mass.

The ethylene content of the first EPDM is 67% by mass or more. The ethylene content of the first EPDM is suitably 68% by mass or more and more suitably 70% by mass or more, and suitably 80% by mass or less and more suitably 76% by mass or less. The ethylene content of the second EPDM is 57% by mass or less. The ethylene content of the second EPDM is suitably 45% by mass or more and more suitably 47% by mass or more, and suitably 55% by mass or less and more suitably 53% by mass or less.

The ratio of the ethylene content of the first EPDM to the ethylene content of the second EPDM (the first EPDM's ethylene content/the second EPDM's ethylene content) is suitably 1.3 or more and more suitably 1.4 or more, and suitably 1.7 or less and more suitably 1.6 or less. The average ethylene content of the EPDM mixture as the rubber component is 54% by mass or more and 59% by mass or less, and suitably 55% by mass or more and suitably 58% by mass or less.

Example diene components of the first and second EPDMs include ethylidene norbornene (ENB), dicyclopentadiene, and 1,4-hexadiene. Among these substances, ethylidene norbornene is suitable. Suitably, the diene components of the first and second EPDMs are the same as each other.

If the diene component of the first EPDM is ethylidene norbornene, the ENB content is suitably 2.0% by mass or more and more suitably 3.5% by mass or more, and suitably 7.0% by mass or less and more suitably 6.0% by mass or less. If the diene component of the second EPDM is ethylidene norbornene, the ENB content is suitably 2.0% by mass or more and more suitably 3.5% by mass or more, and suitably 10% by mass or less, more suitably 7.0% by mass or less, and still more suitably 6.0% by mass or less.

If the diene components of the first and second EPDMs are ethylidene norbornene, the ratio of the ENB content of the first EPDM to the ENB content of the second EPDM (the first EPDM's ENB content/the second EPDM's ENB content) is suitably 0.5 or more and more suitably 0.7 or more, and suitably 2.0 or less and more suitably 1.5 or less. The average ENB content of the EPDM mixture as the rubber component is suitably 3.0% by mass or more and more suitably 4.0% by mass or more, and suitably 7.0% by mass or less and more suitably 6.0% by mass or less.

The content of the first EPDM in the EPDM mixture as the rubber component is suitably 10% by mass or more and more suitably 15% by mass or more, and suitably 45% by mass or less and more suitably 40% by mass or less. The content of the second EPDM in the EPDM mixture as the rubber component is suitably 55% by mass or more and more suitably 60% by mass or more, and suitably 85% by mass or less and more suitably 90% by mass or less.

The content of the second EPDM is larger than the content of the first EPDM in the EPDM mixture as the rubber component. The ratio of the content of the first EPDM to the content of the second EPDM (the first EPDM content/second EPDM content) in the EPDM mixture as the rubber component is suitably 0.15 or more and more suitably 0.25 or more, and suitably 0.8 or less and more suitably 0.7 or less.

The Mooney viscosity of the first EPDM at 125° C. is suitably 40 $ML_{1+4}$(125° C.) or more and more suitably 50 $ML_{1+4}$(125° C.) or more, and suitably 80 $ML_{1+4}$(125° C.) or less and more suitably 70 $ML_{1+4}$(125° C.) or less. The Mooney viscosity of the second EPDM at 125° C. is suitably 10 $ML_{1+4}$(125° C.) or more and more suitably 15 $ML_{1+4}$(125° C.) or more, and suitably 50 $ML_{1+4}$(125° C.) or less and more suitably 35 $ML_{1+4}$(125° C.) or less. The Mooney viscosity is measured based on JIS K6300.

Suitably, the Mooney viscosity of the first EPDM at 125° C. is greater than the Mooney viscosity of the second EPDM at 125° C. The ratio of the Mooney viscosity of the first EPDM at 125° C. to the Mooney viscosity of the second EPDM at 125° C. (the first EPDM's Mooney viscosity/the second EPDM's Mooney viscosity) is suitably 1.5 or more and more suitably 2.0 or more, and suitably 4.0 or less and more suitably 3.0 or less.

Suitably, the EPDM mixture as the rubber component of the rubber composition which makes the compressed rubber layer 11 is crosslinked by using sulfur. The content of the sulfur in the uncrosslinked rubber composition before being formed into the compressed rubber layer 11 is suitably 0.5 parts by mass or more and more suitably 0.8 parts by mass or more, and suitably 3.0 parts by mass or less and more suitably 2.0 parts by mass or less. In the rubber composition which makes the compressed rubber layer 11, the EPDM mixture as the rubber component may be crosslinked by using an organic peroxide, or may be crosslinked by using both of sulfur and an organic peroxide.

If sulfur is used to crosslink the EPDM mixture as the rubber component of the rubber composition which makes the compressed rubber layer 11, it is suitable that the rubber composition that makes the compressed rubber layer 11 contain a thiuram-based vulcanization accelerator and a sulfenamide-based vulcanization accelerator. In this case, the rubber composition that makes the compressed rubber layer 11 may contain the thiuram-based vulcanization accelerator and the sulfenamide-based vulcanization accelerator alone, or may further contain another vulcanization accelerator in addition to said vulcanization accelerators.

Examples of the thiuram-based vulcanization accelerator include tetramethylthiuram disulfide (TMTD), tetraethylthiuram disulfide (TETD), tetrakis(2-ethylhexyl)thiuram disulfide, tetramethylthiuram monosulfide (TMTM), and dipentamethylenethiuram tetrasulfide (DPTT). It is suitable to use one kind or two or more kinds of these substances as the thiuram-based vulcanization accelerator. It is more suitable to use tetraethylthiuram disulfide (TETD) as the thiuram-based vulcanization accelerator. The content of the thiuram-based vulcanization accelerator in the rubber composition that makes the compressed rubber layer 11 is suitably 0.3 parts by mass or more and more suitably 0.5 parts by mass or more, and suitably 2.0 parts by mass or less and more suitably 1.5 parts by mass or less, with respect to 100 parts by mass of the EPDM mixture as the rubber component.

Examples of the sulfenamide-based vulcanization accelerator include N-cyclohexyl-2-benzothiazolyl sulfenamide (CBS), and N-oxydiethylene-2-benzothiazolyl sulfenamide (OBS). It is suitable to use one kind or two or more kinds of these substances as the sulfenamide-based vulcanization accelerator. It is more suitable to use N-oxydiethylene-2- benzothiazolyl sulfenamide (OBS) as the sulfenamide-based vulcanization accelerator. The content of the sulfenamide-based vulcanization accelerator in the rubber composition that makes the compressed rubber layer 11 is suitably 0.3 parts by mass or more and more suitably 0.7 parts by mass or more, and suitably 4.0 parts by mass or less and more suitably 3.0 parts by mass or less, with respect to 100 parts by mass of the EPDM mixture as the rubber component.

The total content of the thiuram- and sulfenamide-based vulcanization accelerators in the rubber composition that makes the compressed rubber layer 11 is suitably 1.0 part by mass or more and more suitably 1.5 parts by mass or more, and suitably 4.5 parts by mass or less and more suitably 3.5 parts by mass or less, with respect to 100 parts by mass of the EPDM mixture as the rubber component. The ratio of the content of the thiuram-based vulcanization accelerator to the content of the sulfenamide-based vulcanization accelerator (the thiuram-based vulcanization accelerator content/the sulfenamide-based vulcanization accelerator content) in the rubber composition that makes the compressed rubber layer 11 is suitably 0.2 or more and more suitably 0.3 or more, and suitably 2.0 or less and more suitably 1.5 or less.

The rubber composition that makes the compressed rubber layer 11 may include short fibers 16. In that case, it is suitable that the short fibers 16 included in the compressed rubber layer 11 be oriented in the belt width direction, and that some of the short fibers 16 exposed on surfaces of the V-shaped ribs 15 of the compressed rubber layer 11 protrude from the surfaces of the V-shaped ribs 15. Instead of being mixed in the rubber composition, the short fibers 16 may be flocked to the surfaces of the V-shaped ribs 15 of the compressed rubber layer 11.

Examples of the short fibers 16 include nylon short fibers, vinylon short fibers, aramid short fibers, polyester short fibers, and cotton short fibers. It is suitable to use one kind or two or more kinds of these fibers as the short fibers 16. It is more suitable to use nylon short fibers as the short fibers 16. The short fibers 16 may be obtained by cutting long fibers into pieces having a predetermined length after the long fibers are subjected to an adhesion treatment in which the long fibers are soaked, for example, in an RFL solution and thereafter heated. The short fibers 16 have a length ranging from 0.2 mm to 5.0 mm, and a fiber diameter ranging from 10 μm to 50 μm, for example. The content of the short fibers 16 with respect to 100 parts by mass of the EPDM mixture as the rubber component is 10 parts by mass or more and 30 parts by mass or less.

Examples of other compound ingredients contained in the rubber composition that makes the compressed rubber layer 11 include a reinforcing material, such as carbon black, a softener, a processing aid, and a vulcanization accelerator aid.

The rubber composition that makes the compressed rubber layer 11 has a peak in the loss tangent (tan δ) in a cross-grain direction corresponding to a belt length direction, suitably at a temperature of −50° C. or higher and more suitably −45° C. or higher, and suitably −25° C. or lower and more suitably −30° C. or lower. The loss tangents are measured using a test piece having a width of 5 mm, a length of 50 mm and a thickness of 1 mm, based on JIS K6394, under the conditions of a test frequency of 10 Hz, a load of 130 g, and a strain amplitude of 0.05%, while gradually increasing the test temperature.

The adhesive rubber layer 12 is in the shape of a strip having a horizontally elongated rectangular cross-section, and has a thickness ranging from 1.0 mm to 2.5 mm, for example. The adhesive rubber layer 12 is made of a rubber composition produced from an uncrosslinked rubber composition prepared by kneading a rubber component with various compound ingredients, including a crosslinker, mixed therein. This uncrosslinked rubber composition is heated and pressed, so that the rubber component is crosslinked by the crosslinker. The thus obtained rubber composition is used for the adhesive rubber layer 12.

The rubber component of the rubber composition that makes the adhesive rubber layer 12 may be crosslinked by using sulfur, or may be crosslinked by using an organic peroxide used as a crosslinker, or further may be crosslinked by using sulfur and an organic peroxide used as crosslinkers.

Examples of the rubber component of the rubber composition that makes the adhesive rubber layer 12 include ethylene-a-olefin elastomer (such as EPDM and EPR), chloroprene rubber (CR), chlorosulfonated polyethylene rubber (CSM), and hydrogenated acrylonitrile-butadiene rubber (H-NBR). Similarly to the compressed rubber layer 11, it is suitable that the rubber component of the rubber composition that makes the adhesive rubber layer 12 be an EPDM.

Examples of other compound ingredients contained in the rubber composition that makes the adhesive rubber layer 12 include a crosslinker, vulcanization accelerator, a reinforcing material, such as carbon black, a softener, a processing aid, and a vulcanization accelerator aid.

The backface reinforcing fabric 13 is made of fabric, such as woven fabric, knitted fabric, and unwoven fabric, made of yarn of cotton, polyamide fibers, polyester fibers, and aramid fibers, for example. The backface reinforcing fabric 13 has a thickness ranging from 0.4 mm to 1.5 mm. The backface reinforcing fabric 13 undergoes an adhesion treatment so that it has adhesiveness to the V-ribbed belt body 10.

The cord 14 is made of twist yarn of fibers, such as polyamide fibers, polyester fibers, and aramid fibers. The diameter of the cord 14 ranges, for example, from 0.5 mm to 2.5 mm. The distance between the centers of the cord 14 which are adjacent to each other in a cross-section ranges from 0.05 mm to 0.20 mm. The cord 14, too, undergoes an adhesion treatment so that it has adhesiveness to the V-ribbed belt body 10.

In the V-ribbed belt B of the embodiment configured as described above, the EPDM mixture as the rubber component of the rubber composition that makes the compressed rubber layer 11 serving as a pulley contacting portion contains the first EPDM with the ethylene content of 67% by mass or more, and the second EPDM with the ethylene content of 57% by mass or less. Further, the content of the second EPDM in the EPDM mixture is larger than the content of the first EPDM in the EPDM mixture, and the average ethylene content of the EPDM mixture is 54% by mass or more and 59% by mass or less. This configuration provides good resistance to cold and wear.

(Belt Transmission System 20 for Driving Accessory of Automobile)

Figure 2:
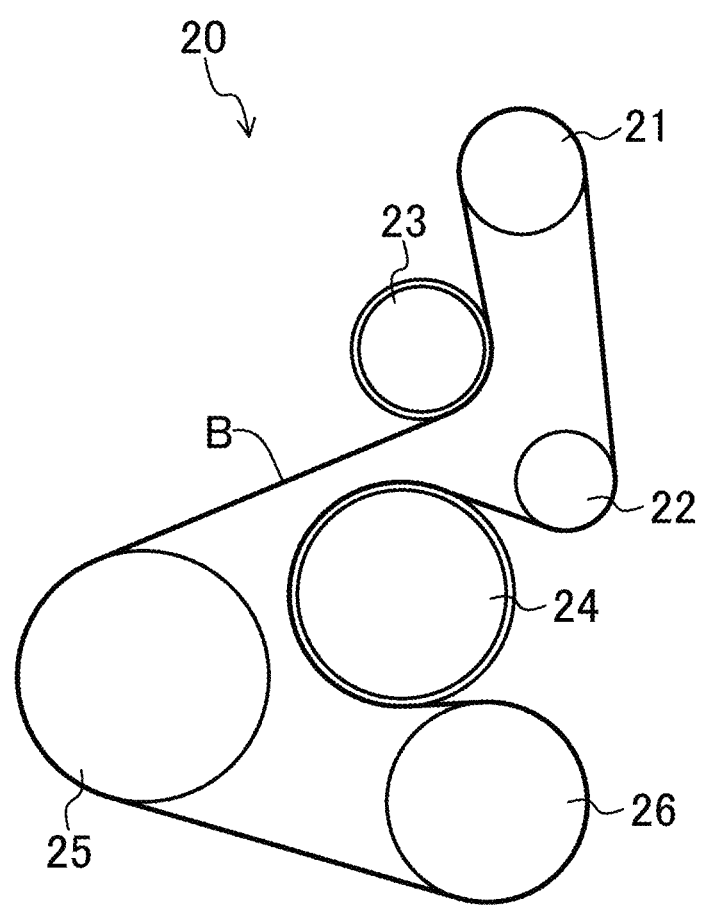
FIG. 2 illustrates a layout of pulleys of a belt transmission system for driving an accessory of an automobile using the V-ribbed belt according to the embodiment.

FIG. 2 illustrates a layout of pulleys of a belt transmission system 20 for driving an accessory of an automobile using the V-ribbed belt B according to the embodiment. The belt transmission system 20 for driving an accessory is a serpentine drive system in which the V-ribbed belt B is wrapped around six pulleys including four ribbed pulleys and two flat pulleys to transmit power.

The belt transmission system 20 for driving an accessory includes a power steering pulley 21, which is a ribbed pulley, at an uppermost position, and an AC generator pulley 22, which is a ribbed pulley, located diagonally down to the right from the power steering pulley 21. The system 20 also includes a tensioner pulley 23, which is a flat pulley, located diagonally down to the left from the power steering pulley 21, and a water pump pulley 24, which is a flat pulley, located below the tensioner pulley 23. The system 20 further includes a crank shaft pulley 25, which is a ribbed pulley, located diagonally down to the left from the tensioner pulley 23 and the water pump pulley 24, and an air conditioning pulley 26, which is a ribbed pulley, located diagonally down to the right from the water pump pulley 24 and the crank shaft pulley 25. These pulleys are made, for example, of pressed metals or castings, or resin moldings using, e.g., nylon resin and phenol resin, with a pulley diameter ranging from φ50 mm to φ150 mm.

In the belt transmission system 20 for driving an accessory, the V-ribbed belt B is wrapped around the power steering pulley 21 with the V-shaped ribs 15 brought into contact with the power steering pulley 21, and then around the tensioner pulley 23 with the backface of the belt B brought into contact with the tensioner pulley 23. After that, the belt B is sequentially wrapped around the crank shaft pulley 25 and the air conditioning pulley 26 with the V-shaped ribs 15 brought into contact with the crank shaft pulley 25 and the air conditioning pulley 26, and further around the water pump pulley 24 with the backface of the belt B brought into contact with the water pump pulley 24. The belt B is then wrapped around the AC generator pulley 22 with the V-shaped ribs 15 brought into contact with the AC generator pulley 22, and returns to the power steering pulley 21 in the end. The belt span length, which is a length of the V-ribbed belt B between the pulleys, ranges from 50 mm to 300 mm, for example. The degree of misalignment allowable between the pulleys ranges from 0° to 2°.

(Method for Forming V-ribbed Belt B)

A method for forming the V-ribbed belt B according to the embodiment will be described with reference to FIGS. 3 to 7.

A method for forming the V-ribbed belt B according to the embodiment includes a preparation step, a shaping step, a cross-linking step, a grinding step, and a width cut step. The V-shaped ribs 15 of the V-ribbed belt B are formed through grinding in the grinding step.

<Preparation Step>

First, compound ingredients are added to a rubber component, and the mixture is kneaded by a mixer, such as a kneader and a Banbury mixer. The resultant uncrosslinked rubber composition is turned into a sheet by calendering, for example, to form uncrosslinked rubber sheets 11' for making a compressed rubber layer 11. Used herein as the rubber component is an EPDM mixture which includes a first EPDM with an ethylene content of 67% by mass or more, and a second EPDM with an ethylene content of 57% by mass or less. If the short fibers 16 are to be added to the compressed rubber layer 11, it is suitable to add the short fibers 16 to the uncrosslinked rubber sheet 11'. An uncrosslinked rubber sheet 12' for making the adhesive rubber layer 12 is formed in a similar manner.

Fabric 13' which makes the backface reinforcing fabric 13 undergoes an adhesion treatment. Specifically, the fabric 13' undergoes one kind or two or more kinds of the following treatments: an adhesion treatment in which the fabric 13' is soaked in a primary coat solution and heated; an adhesion treatment in which the fabric 13' is soaked in an RFL aqueous solution and heated; an adhesion treatment in which the fabric 13' is soaked in rubber cement and dried; and an adhesion treatment in which rubber cement is applied to a surface of the fabric 13' facing the V-ribbed belt body 10 and dried.

Twist yarn 14' which makes the cord 14 undergoes adhesion treatments. Specifically, the twist yarn 14' undergoes an adhesion treatment in which the twist yarn 14' is soaked in a primary coat solution and heated, an adhesion treatment in which the twist yarn 14' is soaked in an RFL aqueous solution and heated, and an adhesion treatment in which the twist yarn 14' is soaked in rubber cement and dried.

<Shaping Step>

Figure 3:
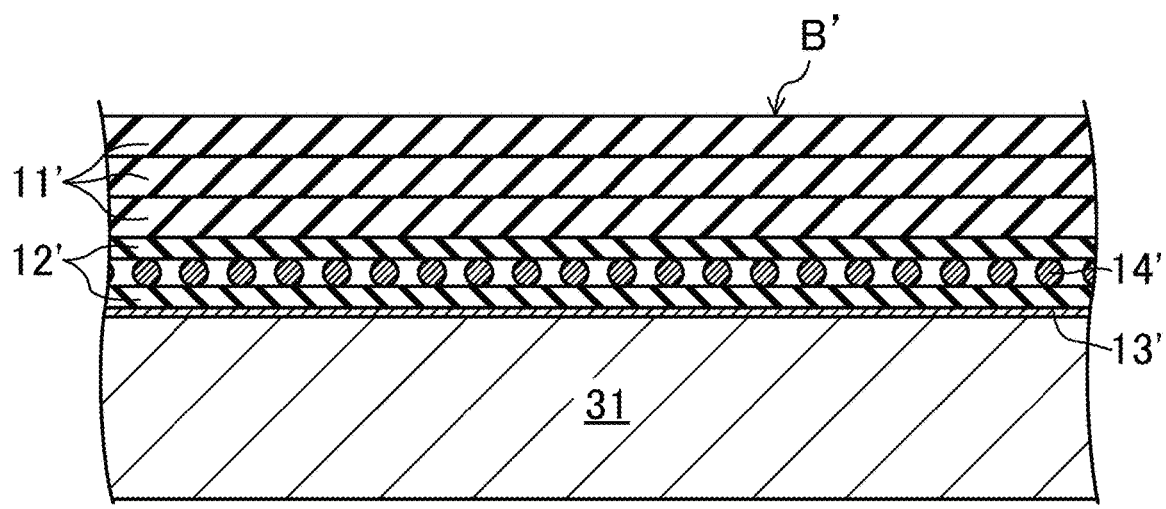
FIG. 3 is a first drawing for explaining a method for forming the V-ribbed belt according to the embodiment.

Subsequently, as illustrated in FIG. 3, the fabric 13' for making the backface reinforcing fabric 13 which has undergone the adhesion treatment(s) and the uncrosslinked rubber sheet 12' for making the adhesive rubber layer 12 are sequentially wrapped around a cylindrical mold 31 so that they are layered on the outer surface of the cylindrical mold 31.

The twist yarn 14' for making the cord 14 which has undergone the adhesion treatments is wrapped around the resultant layers on the cylindrical mold 31 in a helical manner with a predetermined tension applied to the twist yarn 14'. Further, the uncrosslinked rubber sheet 12' for making the adhesive rubber layer 12 and the uncrosslinked rubber sheet 11' for making the compressed rubber layer 11 are sequentially wrapped around, and layered on, the cylindrical mold 31, thereby obtaining a belt formation body B'. The uncrosslinked rubber sheet 12' for making the adhesive rubber layer 12 is wrapped around the cylindrical mold 31 such that its grain direction (i.e., a drawing direction of the sheet 12') corresponds to the belt length direction. The uncrosslinked rubber sheet 11' for making the compressed rubber layer 11 is wrapped around the cylindrical mold 31 such that the cross-grain direction orthogonal to the grain direction corresponds to the belt length direction.

<Cross-Linking Step>

Figure 4:
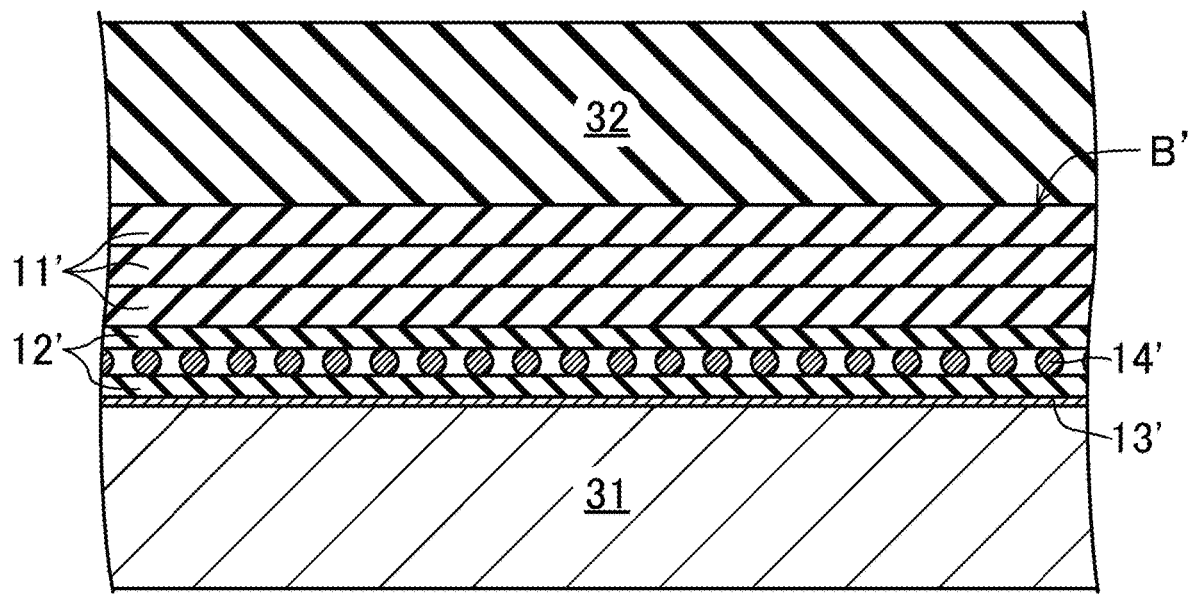
FIG. 4 is a second drawing for explaining a method for forming the V-ribbed belt according to the embodiment.
Figure 5:
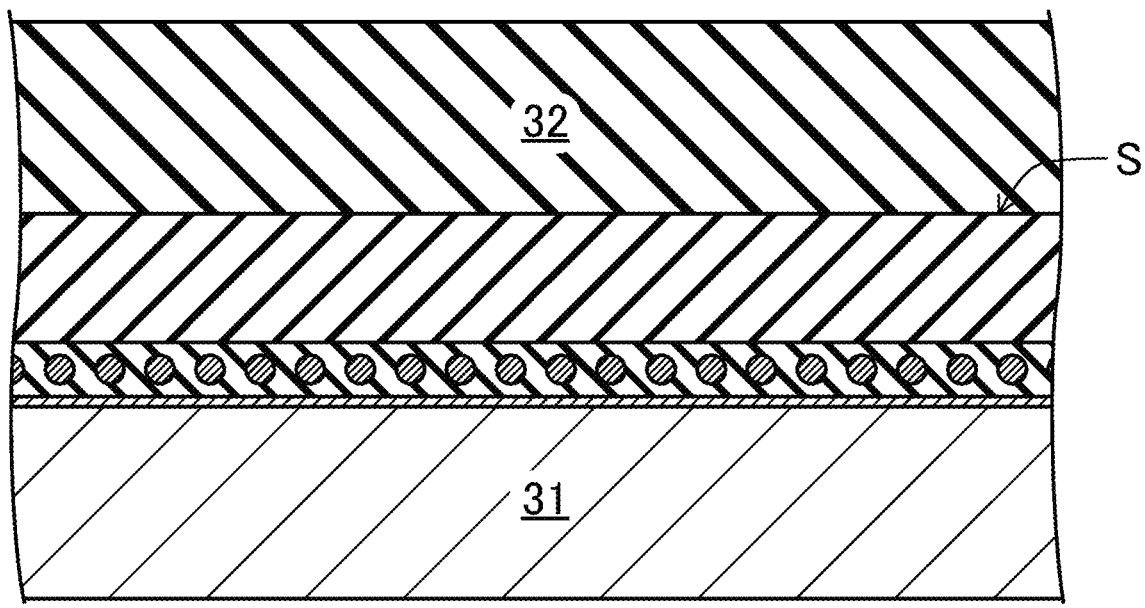
FIG. 5 is a third drawing for explaining a method for forming the V-ribbed belt according to the embodiment.

Subsequently, as illustrated in FIG. 4, a rubber sleeve 32 is placed on the belt formation body B'. The belt formation body B' with the rubber sleeve 32 is placed in a vulcanizer, and the vulcanizer is sealed. The vulcanizer is filled with high-temperature and high-pressure steam, and the belt formation body B' with the rubber sleeve 32 is held in the vulcanizer for a predetermined time. At this moment, cross-linking is promoted in the uncrosslinked rubber sheets 11' and 12', and the uncrosslinked rubber sheets 11' and 12' are integrated with each other and combined with the fabric 13' and the twist yarn 14'. As a result, a cylindrical belt slab S is formed as illustrated in FIG. 5.

<Grinding Step>

Figure 6:
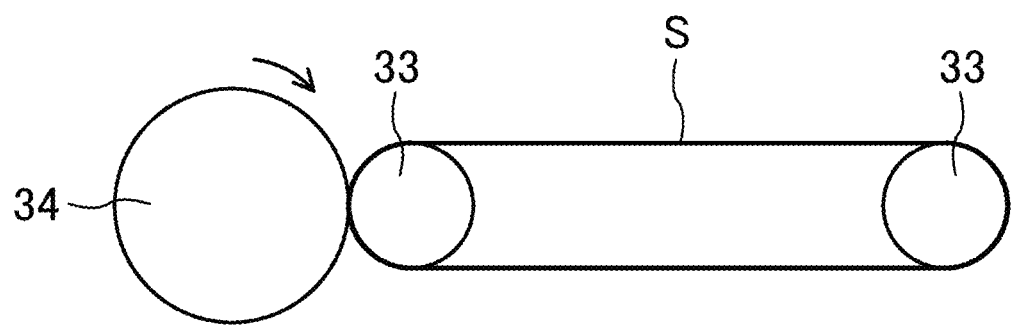
FIG. 6 is a fourth drawing for explaining a method for forming the V-ribbed belt according to the embodiment.
Figure 7:
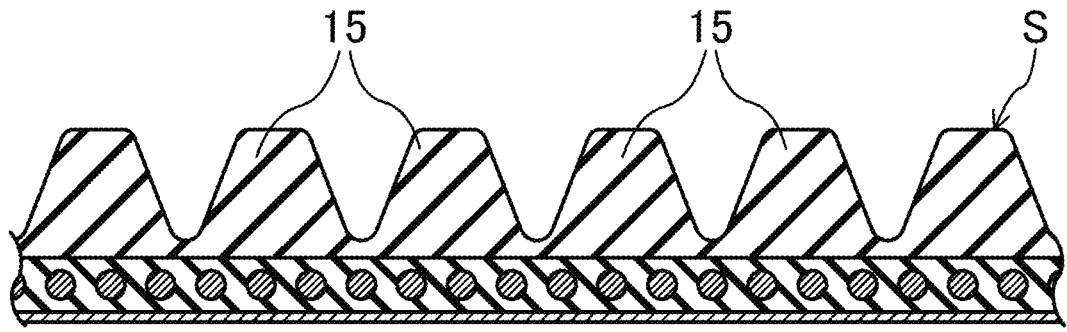
FIG. 7 is a fifth drawing for explaining a method for forming the V-ribbed belt according to the embodiment.

Then, the steam is released from the vulcanizer to end the state of sealing. The belt slab S formed on the cylindrical mold 31 is removed from the mold, and is looped over a pair of slab holding shafts 33 as shown in FIG. 6. A grinding stone 34, which has V-shaped rib formation grooves extending in a circumferential direction of the grinding stone 34 and arranged next to one another in the axial direction of the grinding stone 34, is rotated and brought into contact with the outer surface of the belt slab S, while the belt slab S is also rotated on the pair of slab holding shafts 33, thereby grinding the belt slab S all over the outer surface thereof. As a result, V-shaped ribs 15 are formed on the outer surface of the belt slab S as illustrated in FIG. 7. If necessary, the belt slab S may be cut into pieces in its lengthwise direction for grinding.

<Width Cut Step>

The belt slab S in which the V-shaped ribs 15 are formed by grinding is cut into pieces having a predetermined width, and turned inside out. The V-ribbed belt B is obtained in this manner.

(Other Embodiments)

Figure 8:
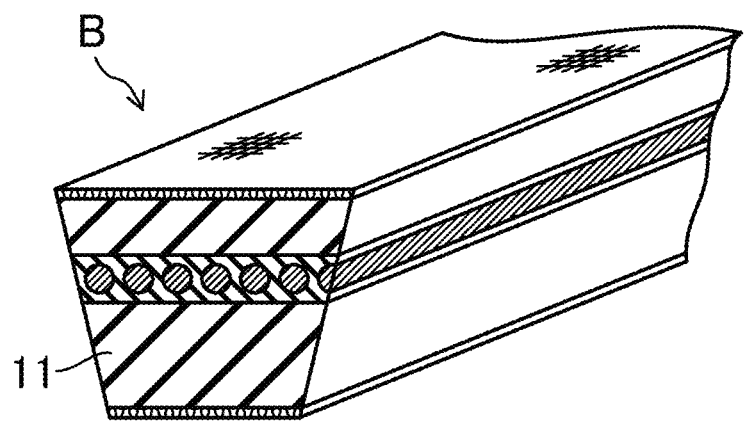
FIG. 8 illustrates a perspective view of a raw edge V-belt according to another embodiment.
Figure 9:
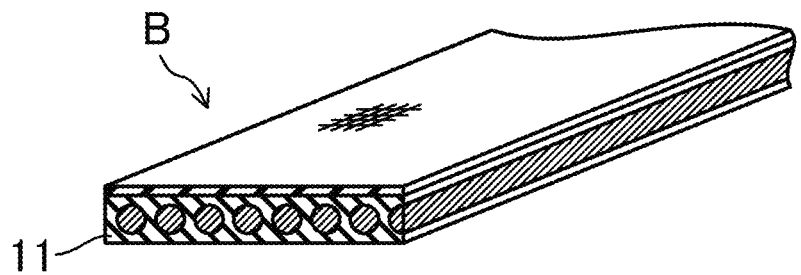
FIG. 9 illustrates a perspective view of a flat belt according to another embodiment.

In the above embodiment, the V-ribbed belt B has been described as a non-limiting example of the friction transmission belt. The friction transmission belt may also be a raw edge V-belt B as illustrated in FIG. 8, or a flat belt B as illustrated in FIG. 9, as long as the compressed rubber layer 11 of the friction transmission belt is made of the rubber composition.

EXAMPLES (V-ribbed Belt)

V-ribbed belts of the following Examples 1 to 4 and Comparative Examples 1 to 3 were prepared by a method similar to the method described in the above embodiment. Particulars of the uncrosslinked rubber sheets for the respective compressed rubber layers are also shown in Table 1.

Example 1

An uncrosslinked rubber sheet for making the compressed rubber layer was formed in the following manner: An EPDM mixture containing 30% by mass of a first EPDM-A (ethylene content: 72% by mass, ENB content: 4.8% by mass, Mooney viscosity: 65 $ML_{1+4}$(125° C.)), and 70% by mass of a second EPDM-B (ethylene content: 50% by mass, ENB content: 4.4% by mass, Mooney viscosity: 30 $ML_{1+4}$(125° C.)) was used as a rubber component; with respect to 100 parts by mass of this rubber component, 2 parts by mass of sulfur as a crosslinker, 1 part by mass of tetraethylthiuram disulfide as a thiuram-based vulcanization accelerator, 1 part by mass of a sulfenamide-based vulcanization accelerator, 60 parts by mass of FEF carbon black, 10 parts by mass of a softener, 1 part by mass of stearic acid as a processing aid, and 5 parts by mass of zinc oxide as a vulcanization accelerator aid, as well as 20 parts by mass of nylon short fibers (fiber length: 1.0 mm, fiber diameter: 26 μm) were added; and the thus obtained product was kneaded by Banbury mixer and thereafter rolled by calender rolls.

The ratio of the ethylene content of the first EPDM-A to the ethylene content of the second EPDM-B (the ethylene content of the first EPDM-A/the ethylene content of the second EPDM-B) in the uncrosslinked rubber sheet for making the compressed rubber layer is 1.4. The average ethylene content in the EPDM mixture as the rubber component is 57% by mass. The ratio of the ENB content of the first EPDM-A to the ENB content of the second EPDM-B (the ENB content of the first EPDM-A/the ENB content of the second EPDM-B) is 1.1. The average ENB content in the EPDM mixture as the rubber component is 4.5% by mass. The ratio of the content of the first EPDM-A to the content of the second EPDM-B (the content of the first EPDM-A/the content of the second EPDM-B) is 0.43. The ratio of the Mooney viscosity of the first EPDM-A at 125° C. to the Mooney viscosity of the second EPDM-B at 125° C. (the Mooney viscosity of the first EPDM-A/the Mooney viscosity of the second EPDM-B) is 2.2. The total content of the thiuram-based vulcanization accelerator and the sulfenamide-based vulcanization accelerator is 2 parts by mass with respect to 100 parts by mass of the EPDM mixture as the rubber component. The ratio of the content of the thiuram-based vulcanization accelerator to the content of the sulfenamide-based vulcanization accelerator (the thiuram-based vulcanization accelerator content/the sulfenamide-based vulcanization accelerator content) is 1.

A product containing EPDM as a rubber component and obtained in a similar manner to how the uncrosslinked rubber sheet for making the compressed rubber layer was obtained, was used as an uncrosslinked rubber sheet for making the adhesive rubber layer.

Woven fabric made of blended fibers of cotton and polyester to which an adhesion treatment had been applied was used as fabric for making the backface reinforcing fabric. Twist yarn made of polyester fibers to which an adhesion treatment had been applied was used as twist yarn for making the cord.

The V-ribbed belt of Example 1 has a length of 1115 mm, a width of 10.68 mm (having three ribs), and a thickness of 4.3 mm. The height of each V-shaped ribs is 2.0 mm.

Example 2

A V-ribbed belt having the same configuration as the V-ribbed belt of Example 1 was used as a V-ribbed belt of Example 2, except that the uncrosslinked rubber sheet for making the compressed rubber layer was formed using a second EPDM-C (ethylene content: 47% by mass, ENB content: 9.8% by mass, Mooney viscosity: 32 $ML_{1+4}$(125° C.)), instead of using the second EPDM-B.

The ratio of the ethylene content of the first EPDM-A to the ethylene content of the second EPDM-C (the ethylene content of the first EPDM-A/the ethylene content of the second EPDM-C) in the uncrosslinked rubber sheet for making the compressed rubber layer is 1.5. The average ethylene content in the EPDM mixture as the rubber component is 55% by mass. The ratio of the ENB content of the first EPDM-A to the ENB content of the second EPDM-C (the ENB content of the first EPDM-A/the ENB content of the second EPDM-C) is 0.49. The average ENB content in the EPDM mixture as the rubber component is 8.3% by mass. The ratio of the content of the first EPDM-A to the content of the second EPDM-C (the content of the first EPDM-A/the content of the second EPDM-C) is 0.43. The ratio of the Mooney viscosity of the first EPDM-A at 125° C. to the Mooney viscosity of the second EPDM-C at 125° C. (the Mooney viscosity of the first EPDM-A/the Mooney viscosity of the second EPDM-C) is 2.0.

Example 3

A V-ribbed belt having the same configuration as the V-ribbed belt of Example 1 was used as a V-ribbed belt of Example 3, except that the uncrosslinked rubber sheet for making the compressed rubber layer was formed using 2-mercaptobenzothiazole (MBT) as a thiazole-based vulcanization accelerator, instead of using the sulfenamide-based vulcanization accelerator.

Example 4

A V-ribbed belt having the same configuration as the V-ribbed belt of Example 1 was used as a V-ribbed belt of Example 4, except that the uncrosslinked rubber sheet for making the compressed rubber layer was formed using 2-mercaptobenzothiazole (MBT) as a thiazole-based vulcanization accelerator and zinc diethyldithiocarbamate (ZnEDC) as a thiocarbamate-based vulcanization accelerator, instead of using the thiuram-based vulcanization accelerator and the sulfenamide-based vulcanization accelerator.

Comparative Example 1

A V-ribbed belt having the same configuration as the V-ribbed belt of Example 1 was used as a V-ribbed belt of Comparative Example 1, except that the uncrosslinked rubber sheet for making the compressed rubber layer was formed using a second EPDM-D (ethylene content: 45% by mass, ENB content: 7.6% by mass, Mooney viscosity: 45 $ML_{1+4}$(125° C.)), instead of using the second EPDM-B.

The ratio of the ethylene content of the first EPDM-A to the ethylene content of the second EPDM-D (the ethylene content of the first EPDM-A/the ethylene content of the second EPDM-D) in the uncrosslinked rubber sheet for making the compressed rubber layer is 1.6. The average ethylene content in the EPDM mixture as the rubber component is 53% by mass. The ratio of the ENB content of the first EPDM-A to the ENB content of the second EPDM-D (the ENB content of the first EPDM-A/the ENB content of the second EPDM-D) is 0.63. The average ENB content in the EPDM mixture as the rubber component is 6.8% by mass. The ratio of the content of the first EPDM-A to the content of the second EPDM-D (the content of the first EPDM-A/the content of the second EPDM-D) is 0.43. The ratio of the Mooney viscosity of the first EPDM-A at 125° C. to the Mooney viscosity of the second EPDM-D at 125° C. (the Mooney viscosity of the first EPDM-A/the Mooney viscosity of the second EPDM-D) is 1.4.

Comparative Example 2

A V-ribbed belt having the same configuration as the V-ribbed belt of Example 1 was used as a V-ribbed belt of Comparative Example 2, except that the uncrosslinked rubber sheet for making the compressed rubber layer was formed using a first EPDM-E (ethylene content: 62% by mass, ENB content: 4.5% by mass, Mooney viscosity: 75 $ML_{1-4}$(125° C.)) instead of the first EPDM-A, and 70% by mass of a second EPDM-F (ethylene content: 54% by mass, ENB content: 4.5% by mass, Mooney viscosity: 27 $ML_{1+4}$ (125° C.)) instead of the second EPDM-B.

The ratio of the ethylene content of the first EPDM-E to the ethylene content of the second EPDM-F (the ethylene content of the first EPDM-E/the ethylene content of the second EPDM-F) in the uncrosslinked rubber sheet for making the compressed rubber layer is 1.1. The average ethylene content in the EPDM mixture as the rubber component is 56% by mass. The ratio of the ENB content of the first EPDM-E to the ENB content of the second EPDM-F (the ENB content of the first EPDM-E/the ENB content of the second EPDM-F) is 1. The average ENB content in the EPDM mixture as the rubber component is 4.5% by mass. The ratio of the content of the first EPDM-E to the content of the second EPDM-F (the content of the first EPDM-E/the content of the second EPDM-F) is 0.43. The ratio of the Mooney viscosity of the first EPDM-E at 125° C. to the Mooney viscosity of the second EPDM-F at 125° C. (the Mooney viscosity of the first EPDM-E/the Mooney viscosity of the second EPDM-F) is 2.8.

Comparative Example 3

A V-ribbed belt having the same configuration as the V-ribbed belt of Example 1 was used as a V-ribbed belt of Comparative Example 3, except that the uncrosslinked rubber sheet for making the compressed rubber layer was formed using a second EPDM-G (ethylene content: 56% by mass, ENB content: 3.8% by mass, Mooney viscosity: 25 $ML_{1-4}$(125° C.)), instead of using the second EPDM-B.

The ratio of the ethylene content of the first EPDM-A to the ethylene content of the second EPDM-G (the ethylene content of the first EPDM-A/the ethylene content of the second EPDM-G) in the uncrosslinked rubber sheet for making the compressed rubber layer is 1.3. The average ethylene content in the EPDM mixture as the rubber component is 61% by mass. The ratio of the ENB content of the first EPDM-A to the ENB content of the second EPDM-G (the ENB content of the first EPDM-A/the ENB content of the second EPDM-G) is 1.3. The average ENB content in the EPDM mixture as the rubber component is 4.1% by mass. The ratio of the content of the first EPDM-A to the content of the second EPDM-G (the content of the first EPDM-A/the content of the second EPDM-G) is 0.43. The ratio of the Mooney viscosity of the first EPDM-A at 125° C. to the Mooney viscosity of the second EPDM-E at 125° C. (the Mooney viscosity of the first EPDM-A/the Mooney viscosity of the second EPDM-E) is 2.6.

TABLE 1

|  | Ethylene Content mass % | ENB Content mass % | Mooney Viscosity $ML_{1+4}$ (125° C.) | Example 1 | Example 2 | Example 3 | Example 4 | Comparative Example 1 | Comparative Example 2 | Comparative Example 3 |
|---|---|---|---|---|---|---|---|---|---|---|
| 1st EPDM-A | 72 | 4.8 | 65 | 30 | 30 | 30 | 30 | 30 |  | 30 |
| 2nd EPDM-B | 50 | 4.4 | 30 | 70 |  | 70 | 70 |  |  |  |
| 2nd EPDM-C | 47 | 9.8 | 32 |  | 70 |  |  |  |  |  |
| 2nd EPDM-D | 45 | 7.6 | 45 |  |  |  |  | 70 |  |  |
| 1st EPDM-E | 62 | 4.5 | 75 |  |  |  |  |  | 30 |  |
| 2nd EPDM-F | 54 | 4.5 | 27 |  |  |  |  |  | 70 |  |
| 2nd EPDM-G | 56 | 3.8 | 25 |  |  |  |  |  |  | 70 |
| Sulfur |  |  |  | 2 | 2 | 2 | 2 | 2 | 2 | 2 |
| Thiuram-based Vulcanization Accelerator |  |  |  | 1 | 1 | 1 |  | 1 | 1 | 1 |
| Sulfenamide-based Vulcanization Accelerator |  |  |  | 1 | 1 |  |  | 1 | 1 | 1 |
| Thiazole-based Vulcanization Accelerator |  |  |  |  |  | 1 | 1 |  |  |  |
| Thiocarbamate-based Vulcanization Accelerator |  |  |  |  |  |  | 1 |  |  |  |
| FEF Carbon Black |  |  |  | 60 | 60 | 60 | 60 | 60 | 60 | 60 |
| Softener |  |  |  | 10 | 10 | 10 | 10 | 10 | 10 | 10 |
| Stearic Acid |  |  |  | 1 | 1 | 1 | 1 | 1 | 1 | 1 |
| Zinc Oxide |  |  |  | 5 | 5 | 5 | 5 | 5 | 5 | 5 |
| Nylon Short Fibers |  |  |  | 20 | 20 | 20 | 20 | 20 | 20 | 20 |
| 1st EPDM-Ethylene Content/2nd EPDM-Ethylene Content |  |  |  | 1.4 | 1.5 | 1.4 | 1.4 | 1.6 | 1.1 | 1.3 |
| EPDM Mixture-Average Ethylene Content (mass %) |  |  |  | 57 | 55 | 57 | 57 | 53 | 56 | 61 |
| 1st EPDM-ENB Content/2nd EPDM-ENB |  |  |  | 1.1 | 0.49 | 1.1 | 1.1 | 0.63 | 1 | 1.3 |

TABLE 1-continued

| | Ethylene Content mass % | ENB Content mass % | Mooney Viscosity ML$_{1+4}$ (125° C.) | Example 1 | Example 2 | Example 3 | Example 4 | Comparative Example 1 | Comparative Example 2 | Comparative Example 3 |
|---|---|---|---|---|---|---|---|---|---|---|
| Content EPDM Mixture-Average ENB Content (mass %) | | | | 4.5 | 8.3 | 4.5 | 4.5 | 6.8 | 4.5 | 4.1 |
| 1st EPDM Content/2nd EPDM Content | | | | 0.43 | 0.43 | 0.43 | 0.43 | 0.43 | 0.43 | 0.43 |
| 1st EPDM-Mooney Viscosity/2nd EPDM-Mooney Viscosity | | | | 2.2 | 2.0 | 2.2 | 2.2 | 1.4 | 2.8 | 2.6 |
| Thiuram-based Vulcanization Accelerator Content + Sulfenamide-based Vulcanization Accelerator Content | | | | 2 | 2 | — | — | 2 | 2 | 2 |
| Thiuram-based Vulcanization Accelerator Content/Sulfenamide-based Vulcanization Accelerator Content | | | | 1 | 1 | — | — | 1 | 1 | 1 |
| Loss Tangent Peak Temperature (° C.) | | | | −38 | −36 | −38 | −38 | −35 | −38 | −34 |
| Belt's Cold Resistance Lifetime (Hour) | | | | 100 | 80 | 80 | 60 | 60 | 100 | 10 |
| Belt's Wear Rate (%) | | | | 1.2 | 2.0 | 2.0 | 2.5 | 3.0 | 3.5 | 1.5 |

(Test Method)

<Temperature at Loss Tangent Peak>

Uncrosslinked rubber sheets for making the compressed rubber layers in Examples 1 to 4 and Comparative Examples 1 to 3 were prepared without nylon short fibers. The thus obtained uncrosslinked rubber sheets were press molded under the conditions of 170° C. and 20 minutes, thereby forming crosslinked rubber composition sheets. Loss tangents (tan δ) of these crosslinked rubber composition sheets in a cross-grain direction, which corresponds to a belt length direction, were measured, while gradually increasing the test temperature, based on JIS K6394 under the conditions of a test frequency of 10 Hz, a mean strain of 1.5%, and a strain amplitude of 1.0% to obtain a temperature at a peak in the loss tangent.

<Belt Running Test>

Figure 10:
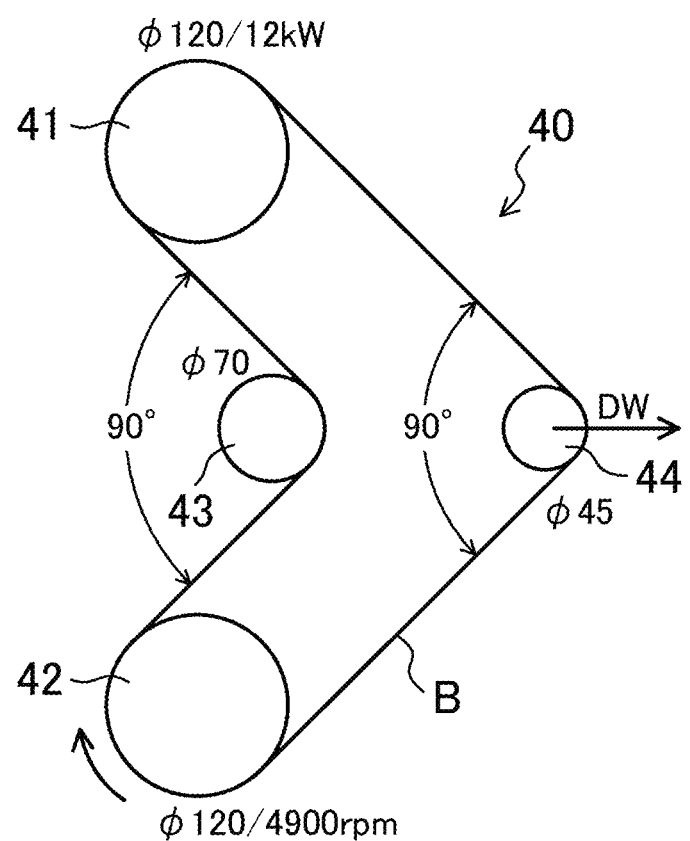
FIG. 10 illustrates a layout of pulleys of a belt running tester.

FIG. 10 illustrates a layout of pulleys of a belt running tester 40.

The belt running tester 40 includes a first ribbed driven pulley 41 with a diameter of φ120 mm provided at a uppermost position, a ribbed drive pulley 42 with a diameter of φ120 mm provided so as to align with the pulley 41 in a vertical direction, an idler pulley 43 with a diameter of φ70 mm provided at a midpoint between the pulleys 41 and 42 in the vertical direction, and a second ribbed driven pulley 44 with a diameter of φ45 mm provided on the right of the idler pulley 43. The V-ribbed belt B is wrapped around the belt running tester 40 such that: its V-shaped ribs come into contact with the first ribbed driven pulley 41, the ribbed drive pulley 42, and the second ribbed driven pulley 44; its backface comes into contact with the idler pulley 43; and the wrap-around angle of the V-ribbed belt B over each of the second ribbed driven pulley 44 and the idler pulley 43 is 90 degrees. The second ribbed driven pulley 44 is movable in a lateral direction so that a belt tension is applicable to the V-ribbed belt B.

—Cold Resistance Evaluation Test—

Each of the V-ribbed belts B of the Examples 1 to 4 and Comparative Examples 1 to 3 was wrapped around the first ribbed driven pulley 41, ribbed drive pulley 42, idler pulley 43, and second ribbed driven pulley 44 of the belt running tester 40. The second ribbed driven pulley 44 was pulled laterally, thereby applying a load (a dead weight DW) of 834 N to the pulley 44, and a rotation load of 12 kW (16 horsepower) was applied to the first ribbed driven pulley 41. In this state, one-hour belt running in which the ribbed drive pulley 42 was rotated counterclockwise at 4900 rpm at the ambient temperature of −40° C. for one hour, and one-hour rest in which the ribbed drive pulley 42 was stopped for one hour, were repeated. The surface of the compressed rubber layer was visually checked every ten-hour increment of the total belt running time. The test was stopped when a crack was found in the compressed rubber layer. The total belt running time till this point was regarded as the belt's cold resistance lifetime. The maximum total belt running time was 100 hours.

—Wear Resistance Evaluation Test—

The mass of each of the V-ribbed belts B of the Examples 1 to 4 and Comparative Examples 1 to 3 was measured. Then, each of these belts was wrapped around the first ribbed driven pulley 41, ribbed drive pulley 42, idler pulley 43, and second ribbed driven pulley 44 of the belt running tester 40. The second ribbed driven pulley 44 was pulled laterally, thereby applying a load (a dead weight DW) of 834 N to the pulley 44, and a rotation load of 12 kW (16 horsepower) was applied to the first ribbed driven pulley 41. In this state, 200-hour belt running was carried out in which the ribbed drive pulley 42 was rotated counterclockwise at 4900 rpm at the ambient temperature of 80° C. After the 200-hour belt running, the mass of each V-ribbed belt B was measured. A reduction in mass of the V-ribbed belt B after the belt running was divided by the mass of the V-ribbed belt B before the belt running, thereby obtaining a wear rate of the belt.

(Test Results)

The test results are shown in Table 1.

Table 1 shows that Examples 1 to 3 which satisfy the following conditions: the EPDM mixture as the rubber component of the rubber composition that makes the compressed rubber layer serving as a pulley contacting portion contains the first EPDM with the ethylene content of 67% by mass or more, and the second EPDM with the ethylene content of 57% by mass or less; the content of the second EPDM is larger than the content of the first EPDM; and the average ethylene content is 54% by mass or more and 59% by mass or less, exhibit better resistance to cold than Comparative Examples 1 and 3 not satisfying the conditions that the average ethylene content is 54% by mass or more and 59% by mass or less.

Further, Examples 1 to 3 exhibit better resistance to wear than Comparative Example 1 in which the average ethylene content is less than 54% by mass, and Comparative Example 2 not satisfying the conditions that the first EPDM with the ethylene content of 67% by mass or more and the second EPDM with the ethylene content of 57% by mass or less are contained.

The present invention is useful in the technical field of friction transmission belts.

The embodiments have been described above as example techniques of the present disclosure, in which the attached drawings and the detailed description are provided. As such, elements illustrated in the attached drawings or the detailed description may include not only essential elements for solving the problem, but also non-essential elements for solving the problem in order to illustrate such techniques. Thus, the mere fact that those non-essential elements are shown in the attached drawings or the detailed description should not be interpreted as requiring that such elements be essential. Since the embodiments described above are intended to illustrate the techniques in the present disclosure, it is intended by the following claims to claim any and all modifications, substitutions, additions, and omissions that fall within the proper scope of the claims appropriately interpreted in accordance with the doctrine of equivalents and other applicable judicial doctrines

What is claimed is:

1. A friction transmission belt a pulley contacting portion of which is made of a rubber composition containing an EPDM mixture as a rubber component, wherein
    the EPDM mixture as the rubber component includes a first EPDM with an ethylene content of 67% by mass or more and a second EPDM with an ethylene content of 57% by mass or less,
    a content of the second EPDM in the EPDM mixture is larger than a content of the first EPDM in the EPDM mixture, and
    an average ethylene content of the EPDM mixture is 54% by mass or more and 59% by mass or less,
    a diene component of each of the first EPDM and the second EPDM is ethylidene norbornene (ENB), an ENB content of the first and the second EPDM is 2.0% by mass or more and 7.0% by mass or less, an average ENB content of the EPDM mixture as the rubber component is 4.0% by mass or more and 6.0% by mass or less, and a ratio of the ENB content of the first EPDM to the ENB content of the second EPDM is 0.7 or more and 1.5 or less,
    the EPDM mixture as the rubber component of the rubber composition is crosslinked by using sulfur, and
    the rubber composition contains a thiuram-based vulcanization accelerator and a sulfenamide-based vulcanization accelerator.

2. The friction transmission belt of claim 1, wherein a ratio of the ethylene content of the first EPDM to the ethylene content of the second EPDM is 1.3 or more and 1.7 or less.

3. The friction transmission belt of claim 1, wherein a ratio of the content of the first EPDM to the content of the second EPDM in the EPDM mixture as the rubber component is 0.15 or more and 0.8 or less.

4. The friction transmission belt of claim 1, wherein a Mooney viscosity of the first EPDM at 125° C. is greater than a Mooney viscosity of the second EPDM at 125° C.

5. The friction transmission belt of claim 4, wherein a ratio of the Mooney viscosity of the first EPDM at 125° C. to the Mooney viscosity of the second EPDM at 125° C. is 1.5 or more and 4.0 or less.

6. The friction transmission belt of claim 1, wherein a total content of the thiuram-based vulcanization accelerator and the sulfenamide-based vulcanization accelerator in the rubber composition is 1.0 part by mass or more and 4.5 parts by mass or less with respect to 100 parts by mass of the EPDM mixture as the rubber component.

7. The friction transmission belt of claim 1, wherein a ratio of a content of the thiuram-based vulcanization accelerator to a content of the sulfenamide-based vulcanization accelerator in the rubber composition is 0.2 or more and 2.0 or less.

8. The friction transmission belt of claim 1, wherein the rubber composition has a peak in loss tangent in a direction corresponding to a belt length direction at a temperature of −25° C. or lower, the loss tangent being measured using a test piece of the rubber composition having a width of 5 mm, a length of 50 mm, and a thickness of 1 mm, based on JIS K6394, under conditions of a test frequency of 10 Hz, a load of 130 g, and a strain amplitude of 0.05%, while gradually increasing a test temperature.

* * * * *